G. W. LORD.
FOOT CONTROL ACCELERATOR FOR MOTOR CARS.
APPLICATION FILED MAR. 17, 1916.
1,216,708.
Patented Feb. 20, 1917.
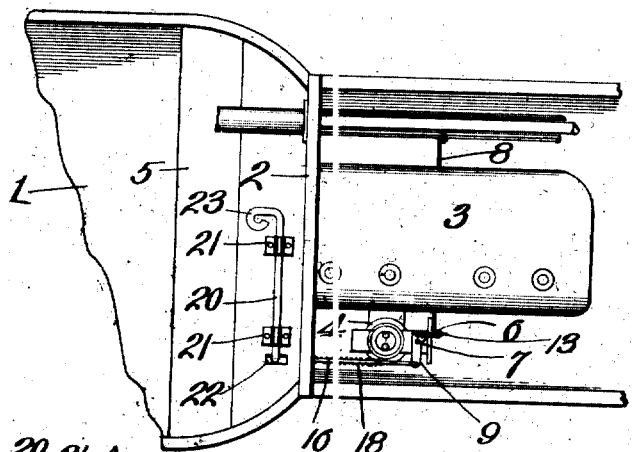
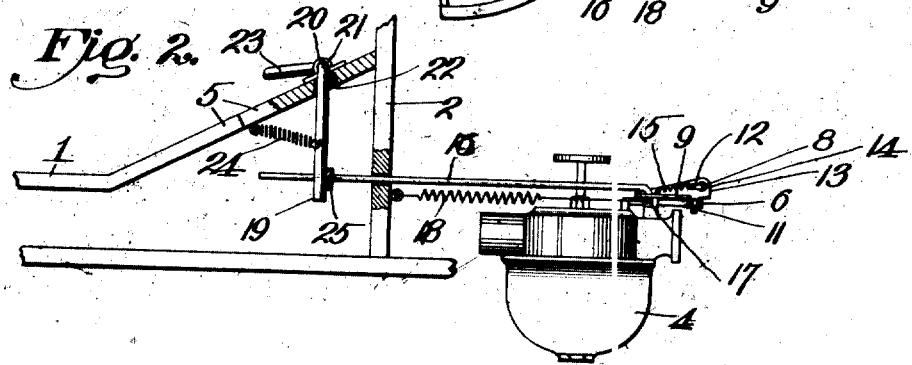
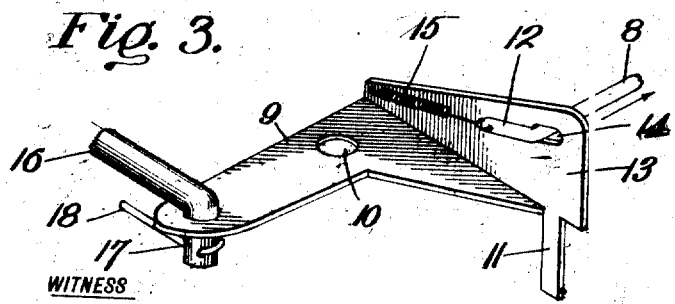
WITNESS
INVENTOR
Geo. W. Lord.
BY
ATTORNEY

UNITED STATES PATENT OFFICE.

GEORGE W. LORD, OF EXCELSIOR SPRINGS, MISSOURI.

FOOT-CONTROL ACCELERATOR FOR MOTOR-CARS.

1,216,708.  Specification of Letters Patent.  Patented Feb. 20, 1917.

Application filed March 17, 1916. Serial No. 85,206

*To all whom it may concern:*

Be it known that I, GEORGE W. LORD, a citizen of the United States, residing at Excelsior Springs, in the county of Clay and State of Missouri, have invented certain new and useful Improvements in Foot-Control Accelerators for Motor-Cars, of which the following is a specification.

This invention relates to foot accelerators for motor cars and more especially to devices designed for attachment to Ford cars and the like, whereby the foot may be utilized for operating the throttle of the carbureter to increase the supply of gas to the engine, and my object is to produce a simple, strong, durable and cheap accelerator attachment which can be easily, quickly and cheaply applied to a car and which will perform its function efficiently and without interfering with the operation of the throttle by the customary hand control mechanism.

With this object in view, the invention consists in certain novel and peculiar features of construction and organization as hereinafter described and claimed; and in order that it may be fully understood reference is to be had to the accompanying drawing, in which—

Figure 1, is a top plan view of a portion of a car equipped with a foot accelerator attachment embodying my invention.

Fig. 2, is a side elevation with the sides of the car omitted.

Fig. 3, is a detail perspective view of a bell crank lever to be mounted on the carbureter and utilized to operate the throttle thereof and at the same time form a support for the cross rod whereby the throttle is operated from the hand control mechanism.

Referring to the drawings in detail, 1 is the body portion, 2 the dash, 3 the engine and 4 the carbureter of the car. 5 represents the foot board composed as in Ford cars, of two members, the foremost being removable as customary.

6 indicates the customary crank arm secured to the stem 7 of the throttle. 8 is the cross rod completely connected to the front end of said crank arm and adapted to be operated by the hand controlled mechanism, not shown, for opening and closing the throttle.

Referring now to the features embodying the invention, 9 is a bell-crank lever provided with an axial opening 10 to receive the upper end of the stem of the throttle where the stem projects above the crank arm 6, and said bell-crank lever which rests on crank arm 6, is provided with a finger 11 extending down through an opening in the said crank arm, the lower end of the finger after it is fitted through the crank arm, being bent to a horizontal position so that it cannot be accidentally disengaged from the said crank arm. The finger is shown as bent in Fig. 2. The bell-crank lever is provided with an upwardly projecting flange 13 having a slot 14 for the reception of the adjacent end of the cross rod 8, the end 12 of said rod extending rearwardly and being connected by a retractile spring 15 to the bell crank lever, which spring tends to hold the rod 8 against the rear end of said slot 14 so that the rod cannot turn out of adjustment and incidentally to prevent vibration and undue wear.

When the hand controlled mechanism is operated the bent end of the rod 8 imparts pivotal movement to the bell crank lever in the direction indicated by the arrow in Fig. 3, to open the throttle. When the bell crank is operated through the foot control lever, hereinafter mentioned, the slot 14 accommodates such action without affecting the position of the rod 8, as will be readily understood by reference to Fig. 3.

16 is a push rod extending through the dash and terminating in the downturned end 17 pivotally engaging the outwardly projecting arm of the bell-crank, and 18 is a spring secured at its opposite ends to the dash, to front end 17, of rod 16 and to the dash, to normally hold the bell crank in the position shown, that is with the throttle closed. The rod 16 extends slidingly through an arm 19 of a rock shaft 20 arranged upon the forward foot board and mounted in bearings 21 secured thereto said foot board being provided with a slot 22 for the accommodation of said arm 19. At its inner end the rock shaft is provided with a rearwardly projecting foot lever 23, and said lever is held normally elevated and ready to be depressed by the driver's foot, by a retractile spring 24, secured at its opposite ends to the foremost foot board and to said arm 19.

The rod 16 is equipped with an adjustable collar 25, to provide an abutment against which the arm 19 can apply pressure to operate the bell crank in the direction indicated by the arrow, Fig. 3, the said collar being made adjustable for accommodating the attachment to cars in which the distance between the arm 19 and the bell crank varies.

In operation the application of pressure on the foot lever 23 overcomes the resistance of springs 24 and 18 and operates the bell crank lever as explained, and thereby opens the throttle more or less, it being noted that the bell crank lever can thus operate because it slides freely on the rod 8. When the pressure on the foot lever is removed the spring 24 retracts and returns the foot lever to normal position and thus permits spring 18 to retract and imparts rearward movement to rod 16 and closing or reverse movement to the bell crank lever. In the event the hand controlled mechanism is operated to open the throttle, the rod 8 is moved to the left and thus operates the bell crank lever in the same direction and incidentally draws the rod 16 forward against the resistance of spring 18 which spring when the hand control mechanism is returned to normal position incidentally returns the rod 16, the bell crank and the throttle to normal position.

From the foregoing it will be apparent that this foot accelerator attachment is operative independently of the hand control mechanism and does not interfere in any way with the operation of the throttle by such mechanism and that when the hand controlled mechanism is returned to normal position, the foot accelerator mechanism is in position for instant operation. It is of course understood that I reserve the right to make all changes falling within the spirit and scope of the appended claims.

I claim:

1. The combination in a motor car, of a carbureter, a transversely extending rod having a bent end adjacent the carbureter and adapted for hand actuation, a bell-crank lever pivotally mounted on the carbureter about coincidentally with the axis of the throttle, and provided with a flange having a slot loosely receiving said rod inward of the bent end thereof, a spring for holding said rod pressed yieldingly against said flange at the rear end of the slot therein, foot-actuated means for rocking said bell-crank lever to cause it to open the throttle and slide on said rod without imparting endwise movement to the same, and yielding means to return the bell-crank lever to close the throttle.

2. The combination in a motor car, of a carbureter, a hand-actuated transversely extending rod having a bent end adjacent the carbureter, a bell-crank lever pivoted on the carbureter and connected to operate the throttle thereof and provided with a flange having a slot loosely engaging the said rod inward of the bent end thereof, yielding means for holding said rod at the rear end of the slot of said flange, a slide rod pivoted to the bell-crank lever to rock the same, a foot-lever bearing a sliding relation to said rod, a spring for returning the foot-lever to its original position after each operation thereof, means whereby actuation of the foot-lever by foot pressure shall advance the said slidable rod pivoted to the bell-crank, and a spring for returning said slidable rod to operative relation with the foot-lever after said rod has been advanced through the operation of the bell-crank lever by the transversely extending rod.

3. The combination in a motor car of a carbureter having a throttle, a crank arm for the throttle, a hand controlled rod having a bent end, a lever pivoted coincidentally with the crank arm and provided with an arm secured to the said crank arm and with a flange having a slot slidingly receiving said rod adjacent the bent end thereof so that when the rod is moved in the proper direction said end shall operate said lever to effect the opening of the throttle, a spring for holding said rod pressed against one end of said slot, foot-operated means for operating said lever to open the throttle, and yielding means to effect the closing of the throttle after the same has been opened.

4. The combination in a motor car, of a carbureter having a throttle, a crank arm for the throttle, a hand controlled rod having a bent end, a lever pivoted coincidentally with the crank arm and provided with an arm secured to said crank arm and with a flange having a slot slidingly receiving said rod adjacent the bent end thereof so that when the rod is moved in the proper direction said end shall operate said lever to effect the opening of the throttle, a spring for holding said rod pressed against the inner end of said slot to prevent rattling of the rod on said flange when the car is in motion, a rod pivoted at its front end to said bell crank lever, a spring for holding said bell crank lever with the throttle closed and the rod retracted, a collar upon the rod, a rock shaft mounted in the car and provided with a crank arm to impart forward pressure on said collar, and with a foot lever whereby the rock shaft may be operated to impart such pressure on the collar, and a spring to return the rock shaft to normal position when the pressure upon the foot lever is removed.

5. The combination in a motor car of a carbureter having a throttle, a transversely extending rod to be operated by hand manipulation, a bell crank lever pivoted about coincidentally with and adapted to operate the throttle, and provided with a horizontal opening loosely receiving said rod, a spring to hold the said rod pressed laterally against the bell-crank lever at the rear side of the said opening, and foot operated means for operating the bell-crank lever to operate the throttle without imparting longitudinal movement to said transverse rod.

In testimony whereof, I affix my signature, in the presence of two witnesses.

GEORGE W. LORD.

Witnesses:
H. C. RODGERS,
G. Y. THORPE.